Aug. 18, 1936.  C. J. CURTIS  2,051,164
COMPENSATING PISTON
Filed Aug. 4, 1934  2 Sheets-Sheet 1

Clifton J. Curtis
Inventor

Aug. 18, 1936.          C. J. CURTIS          2,051,164
COMPENSATING PISTON
Filed Aug. 4, 1934          2 Sheets-Sheet 2

Clifton J. Curtis
Inventor

Patented Aug. 18, 1936

2,051,164

UNITED STATES PATENT OFFICE 2,051,164

COMPENSATING PISTON

Clifton J. Curtis, Springfield, Mass.

Application August 4, 1934, Serial No. 738,450

9 Claims. (Cl. 309—30)

This invention relates to pistons for use in engines, pumps, compressors, and the like, and is herein illustratively described in its application to pistons for automobile engines.

In the manufacture of engines of the explosion type such as are employed in automobiles, the piston is commonly manufactured as a single casting, finished as needed and having a relatively loose fit within the cylinder and the clearance between the two is taken up by means of expanding piston rings fitting more or less loosely in grooves in the piston itself. The efficiency of the engine and the satisfaction to be derived from its use depend in large measure upon the perfection of seal which is obtained by the use of such rings. After a period of use the wear of the rings or of the walls of the cylinder or both requires extensive and expensive repairs which cannot always be made with complete satisfaction. There will also be found a wearing away of the skirt of the piston with a resulting piston slap.

Accordingly, an important object of the invention is to provide an improved piston of the self-compensating type by means of which a close fit or seal between the piston and the cylinder is obtained and wear is automatically compensated.

In the illustrated construction, the wall or skirt of the piston is replaced by means of a helically wound strip or band which, by reason of its tendency to unwind, maintains a close contact with the cylinder wall even after wear. In accordance with features of the invention, the adjacent edges of this helical band are maintained in contact with one another and the top edge with the head of the piston by a force, exerted longitudinally of and in a direction substantially parallel to the axis of the cylinder, this force being created by the pressure of one or more springs and the band prevents accidental displacement of the wrist pin and avoids the resultant danger of scoring the cylinder wall. As illustrated, the springs are arranged longitudinally of the piston.

In engines of the explosion type, considerable difficulty is had by reason of side pressure exerted by the piston against the cylinder wall, due to the angular relation of the connecting rod to the axis of the cylinder at some parts of the stroke. This frequently results in imparting a more or less oval form to the cylinder and is not easy to care for by the use of piston rings which cannot readily adapt themselves to other than a circular form. This wearing out of round results in a space between the skirt and the cylinder wall so that the piston rocks and produces a knock. The rings may be tight but the lower part of the piston is loose in the direction of the thrust, causing slap. Still another feature of the invention resides in the provision of compensating braces urged against the desired portions of the walls of the skirt of the piston, in this instance the helical sleeve, in a direction at right angles to the axis of the wrist pin. Preferably and as shown, the outward thrust of these braces is effected by the same springs which act upon the sleeve itself.

These and other features of the invention are described in the following specification taken in connection with the accompanying drawings, in which—

Figure 9:
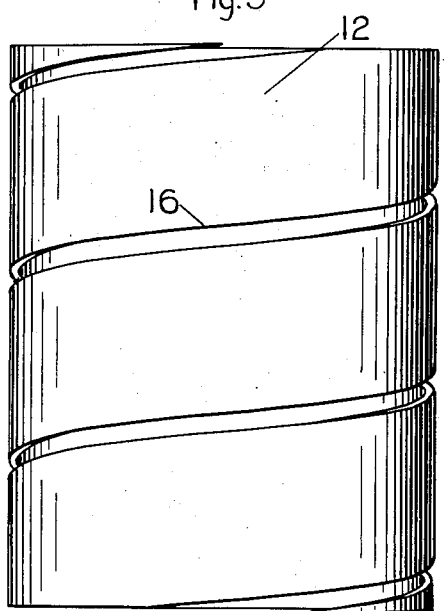
Fig. 9 shows in elevation one of the sleeves in expanded condition before installation in the piston.

The embodiment of my invention herein illustrated comprises a piston having a head 10 which is provided with depending lugs 11 terminating in wrist-pin bearings 14. The head 10 is recessed or undercut, as at 36, to receive a sleeve 12 which takes the place of the usual skirt forming the side wall of pistons as commonly constructed. This skirt is longer than the head 10 forming the body of the piston and is made up of a helical band which extends substantially the length of the piston and the ends of which have been cut off at right angles to the axis of the band, as illustrated in Fig. 9. Such a band, before assembly within the cylinder, may have by reason of its inherent resilience a diameter slightly larger than that of the interior of the cylinder, and the adjacent edges of the band are separated from one another lengthwise of the cylinder, as shown in Fig. 9. This helically disposed metal band or ribbon may be made by cutting a metal tube approximately of the diameter of the inside of the cylinder along a helix described upon its periphery. It may also be constructed by winding a band of uniform width in the form of a helix and then cutting off the ends to form a sleeve of substantially cylindrical shape. The act of inserting such a sleeve in the cylinder of the engine will require a reduction in the radius of the helix which will tend to draw the adjacent edges 16 closer together. In addition, pressure may be exerted longitudinally of the piston to draw the edges together.

To this end, the piston head 10 is provided with flanges 20 which project laterally from the bearings 14, and bolts 22 having wedge-shaped heads 24, for a purpose to be later explained, are passed through suitable openings in these flanges to join therewith a ring or annular plate 26. This plate is provided with bosses 28 through which the bolts pass and is recessed at 30 adjacent to its outer margin to receive the bottom edge of the sleeve 12. Springs 32 surrounding the bolts and interposed between nuts 34 thereon and the plate exert a pressure longitudinally of the piston and, as here shown, in a direction parallel to the axis thereof which pushes the upper edge of the sleeve 12 against a surface on the under side of the head 10. As shown, this surface forms the bottom of a recess 36. This pressure exerted longitudinally of the piston, which may be created by other arrangements and positions of the spring, serves to draw even more closely together the edges 16 of the helical band which forms the sleeve 12. The longitudinal pressure thus exerted will also cause the adjacent edges 16 of the sleeve 12 to slip upon one another so as to expand the sleeve. The rise of the helix is not great enough so that the pressure on the ends of the sleeve will expand it with sufficient force to cause it to bind in the engine cylinder 15.

Figure 6:
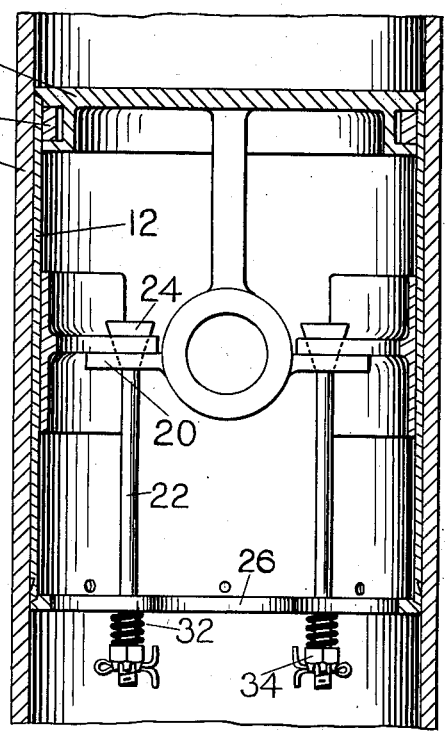
Fig. 6 is a longitudinal section of a modified piston using but one sleeve to form the skirt.

The surfaces at the ends of the sleeves which are received in the recesses 30, 36 may be inclined somewhat from a plane at right angles to the axis of the piston so that the sleeves will be free to move outwardly with respect to these surfaces as they expand to take up wear. This angle, which is exaggerated in the drawings is very slight, however, so that there will not be a wedging action between the piston parts and the engine cylinder 15. Either a single sleeve 12 may be employed, as illustrated in Fig. 6, or the piston may also be provided with an inner sleeve 40 which, except as to dimensions, is constructed like the outer sleeve 12. Preferably and as an additional safeguard against oil leakage, the two sleeves are positioned with respect to one another so that the helical edges 16 and 42 are spaced apart as far as possible. They are kept positively in this position by a pin 44 (Figs. 1 and 2) secured to the outer sleeve and projecting loosely through a hole in the inner sleeve.

In some engines, the wrist pin is fastened to the head, with a bushing on the connecting rod. In others, the connecting rod is fastened to the wrist pin with bushings in the head. In either case, it will be observed that a wrist pin (not shown) positioned in the bearings 14 will be entirely within the sleeves 12 and 40 so that even if it becomes loose from the connecting rod (not shown) or from the bearings, according to the arrangement employed, it cannot touch the wall of the cylinder 15 and therefore cannot score it. When an inner sleeve 40 is employed, another annular plate 46 similar to the ring 26 is positioned within the piston in abutting relation to the lower edge of the inner sleeve 40, being held in contact therewith by additional springs 48 surrounding the bolts 22. This annular plate will also be provided with inwardly extending lugs 49 to receive the bolts 22.

Figure 1:
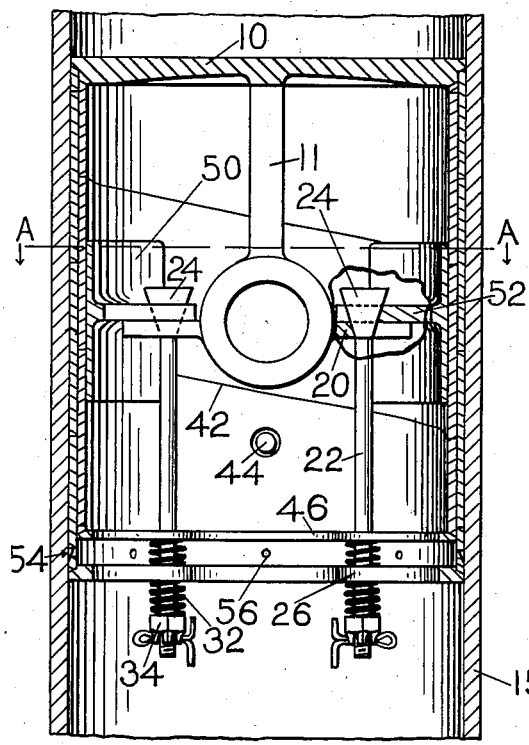
Fig. 1 is a vertical section through one form of my improved piston in position within a cylinder and taken at right angles to the axis of the wrist-pin bore, the pin itself and the connecting rod having been omitted, and the skirt embodying two sleeves.
Figure 2:
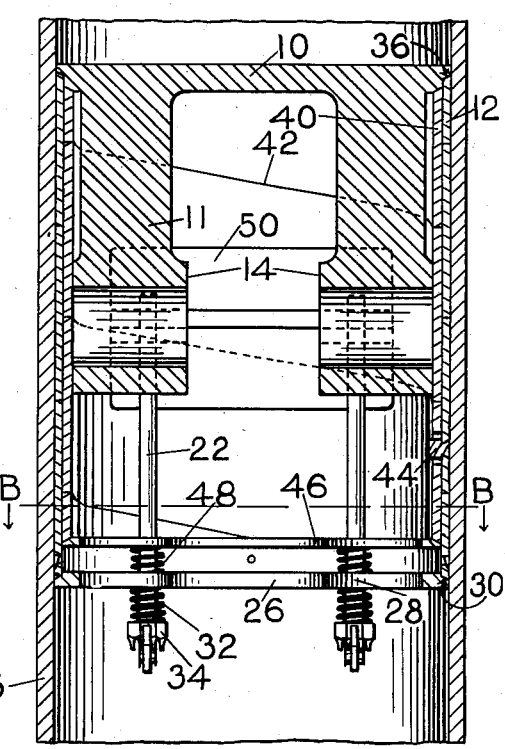
Fig. 2 is a similar longitudinal section but taken along the axis of the wrist-pin bore.
Figure 3:
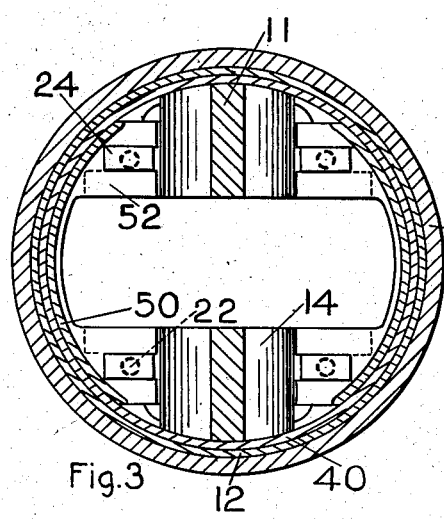
Fig. 3 is a horizontal cross-section on the line A—A in Fig. 1.
Figure 4:
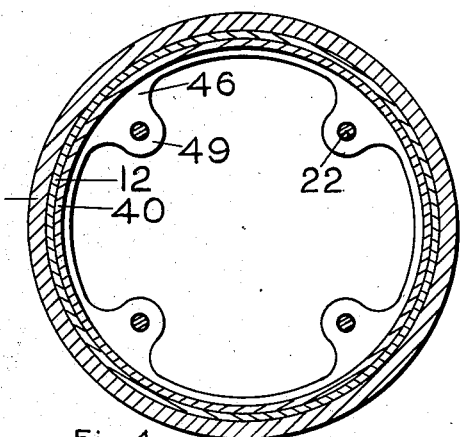
Fig. 4 is a lower cross-sectional view on the line B—B in Fig. 2.
Figure 5:
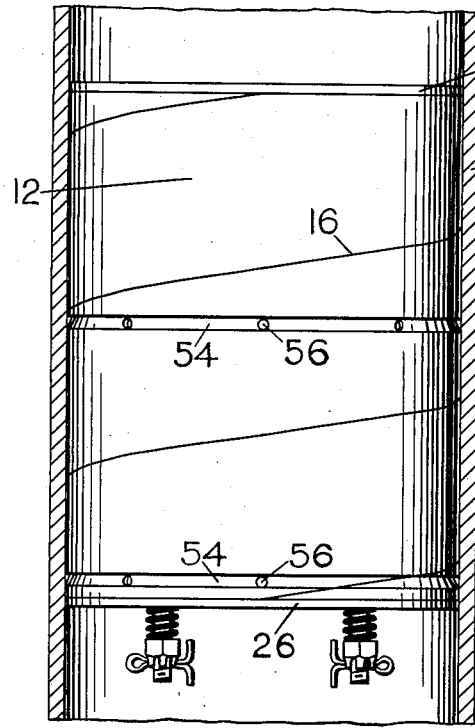
Fig. 5 is a side elevation of the complete piston, the side of the cylinder being cut away.

If desired, my improved piston may also be provided with pads or braces 50 which are oppositely disposed within the sleeves 40 and 12 forming the skirt of the piston and extend each around approximately a quarter of the circumference. Each pad 50 is provided with integral, inwardly extending flanges 52 (Fig. 3) which, as illustrated, are slotted to receive the wedge-shaped heads 24 of the bolts 22. The flanges 52 overlie the flanges 20 which extend outwardly from the wrist-pin bearings thus forming broken braces, and the inclined sides of the wedge-shaped heads 24 coact with inclined sides illustrated as at the bottoms of the slots in the flanges 20 and 52, as shown in Figs. 1 and 3, reacting directly upon the bearings 14 to which the flanges 20 are attached. Longitudinal tension upon the bolts 22, as is provided by the springs 32, tends to draw down the wedge-shaped heads 24 automatically to adjust the lengths of the broken braces and thereby to press the pads 50 outwardly against opposite sides of the skirt of the piston. Such a pressure exerted by the pads may, according to the exact design of the wedges, the strength of the spring, and so forth, cause expansion of the sleeves 40 and 12. The location of these pads 50 is such as to compensate for any wear which may be occasioned by the lateral thrust exerted by the connecting rod through the wrist-pin bearings and tends to distort the piston very slightly to compensate for this wear.

The outer sleeve 12 may be provided with oil grooves 54 and apertures 56 which may be arranged in any of a variety of forms and combinations and which will operate in a manner well understood to help maintain adequate lubrication while avoiding any pumping of the oil.

Figure 7:
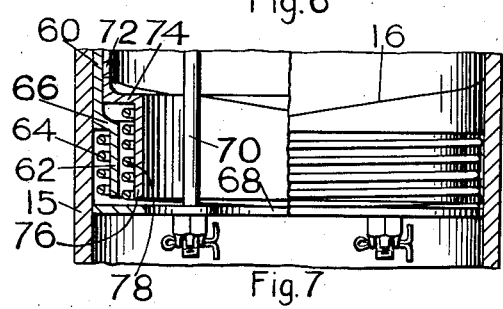
Fig. 7 is an elevation, with parts broken away and in section, of the lower end of a piston showing a modified spring construction for applying pressure to the sleeves of the skirt.

In the modified construction illustrated in Fig. 7, an outer sleeve 60 is turned inwardly and provided with a depending portion 62 around which is disposed a spring 64. This spring bears at its upper end against the shoulder formed by the inturned portion 66 and at its lower end against an annular plate 68 similar to the plate 26. Bolts 70 join this plate with the flanges on the wrist-pin bearings, as in the form previously described. An inner sleeve 72 is also provided with an inturned portion 74 and a depending portion 76, surrounding which is a coiled spring 78 operating similarly to the spring 64 but upon the inner sleeve 72.

Figure 8:
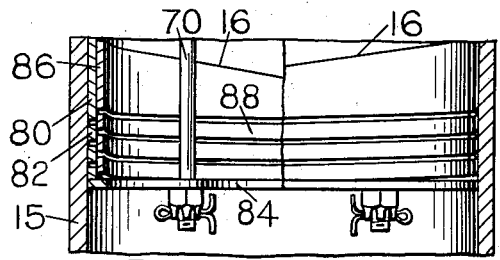
Fig. 8 shows still another construction in which the springs are integral with and form a part of the sleeves.

Still another modified construction is disclosed in Fig. 8 in which an outer sleeve 80 has cut upon its lower end a helical spring 82 bearing upon an annular plate 84 sustained by the bolts 70. Similarly, an inner sleeve 86 has integral therewith a spring portion 88 which also bears against the annular plate 84.

In the use of such a piston as has been described above, the outer sleeve 12 may be held in close contact with the wall of the piston both by the resilience of the band of metal tending to unwind itself, the pressure of the pads 50, and because of the pressure of the springs 32. It will be understood, however, that any one of these forces may be eliminated and one or both of the others depended upon to secure the desired result. The springs 32, here shown as acting directly through the plate 26, tend to hold the edges 16 of the band making up the sleeve in close contact. If the angle of inclination of these edges 16 is great enough, the pressure of the springs 32 may cause slippage of the coils of the band upon one another additionally to expand the sleeve 12 and keep it in contact with the cylinder. Wear between the cylinder and the piston will be continually compensated by this action and, at the same time, the weight of the piston will be less than the usual constructions. In that construction in which two sleeves are employed, the pressure of the inner sleeve will be added to the above-described action of the outer sleeve and, in addition, will serve as a seal against any leakage between the meeting edges 16. If, after long usage, there should be such wear of the sleeve that continued expansion thereof tends to cause leakage between the tapered upper end of the band and the piston head 10, then there may be employed an expansion ring 45, as shown in Fig. 6. This ring will be similar to the piston rings commonly now employed and will be received in a groove in the head 10 of the piston, making a reasonably close fit at its upper and lower edges with the groove. Any leakage past the tapered end of the band and the head of the piston will be stopped by this ring. By properly designing the piston sleeves 12 and 40 and varying the resilience of the metal, the angle of the helical edges and the strength of the springs 32 and 48, pistons can be produced which will meet any desired condition of pressure.

The action of the pads 50 in offsetting the lateral thrust of the connecting rod depends upon the springs 32 and 48 and the angle of inclination of the wedge-shaped heads 24 in the slots of the flanges 20 and 52. Ordinarily the inclination of the sides of the wedge-shaped heads 24 with respect to the axis of the piston will not be sufficient to permit the lateral thrust of the connecting rod to draw up the bolts 22; thus making the action irreversible.

Having thus described my invention, what I claim as new and desire to secure by Letters Patent of the United States is:

1. A compensating piston comprising a head, a helical band resting against an under face of said head and extending substantially the full length of the piston, and resilient members creating a force acting longitudinally of the piston to press the band toward the head, the angle of inclination of the meeting edges of the helical band being such that said pressure slides the convolutions of the band upon themselves to expand the band.

2. A compensating piston having a head provided with wrist-pin bearings, a skirt cooperating with said head, the upper end of said skirt resting against an under face thereof, said skirt surrounding said bearings and depending below them and comprising a helical band of resilient metal the meeting edges of which lie at an angle sufficient to permit slippage between said edges, and means fixed against rotation about the axis of the piston and acting substantially longitudinally of the piston and pressing against the bottom of said band to press the meeting edges of the band together and the band in contact with said head until the convolutions slide circumferentially and expand the band.

3. A compensating piston comprising a head provided with depending wrist-pin bearings, a skirt separate from said head and longer than said head, said skirt consisting of a one-piece, thin, helical band extending substantially the full axial extent of the piston, said skirt being adapted to expand to bring its convolutions into tight contact with the wall of a cylinder in which the piston is positioned, said head being constructed and arranged to abut and coact with the upper end of said skirt, and means including springs acting on the lower end of said band to push said skirt against the head and to close the spaces between the convolutions.

4. A compensating piston comprising a head, an expansible skirt, a wrist-pin bearing attached to said head, a pad bearing against said skirt opposite said wrist-pin bearing, and means comprising a wedge and a spring creating a pressure on the wedge for moving said pad away from said bearing thereby to compensate for wear occasioned by lateral thrust upon the wrist-pin bearing.

5. A compensating piston comprising a wrist-pin bearing, an expansible skirt surrounding said bearing, oppositely disposed thrust members acting on said skirt adjacent to said bearing, means including coacting rigid wedge members reacting directly upon said bearing for pushing said thrust members away from said bearing thereby to compensate for wear occasioned by lateral thrust upon the wrist-pin bearing, and springs acting longitudinally of the piston to cause said wedge members to push out said thrust members.

6. A compensating piston comprising a head, an expansible skirt composed of a helical band adapted to be expanded radially by pressure exerted upon said band longitudinally of the piston, a laterally acting thrust member within said piston, and means comprising a spring for applying a radial pressure to said thrust member and a longitudinal pressure to said band.

7. A compensating piston comprising a head having a wrist-pin bearing, an expansible skirt, a compensating brace between the wrist-pin bearing and the skirt, a wedge for elongating said brace thereby to exert radial pressure upon the skirt, and means including a spring constructed and arranged to apply pressure to the skirt to expand it radially and to apply pressure to said wedge to elongate said brace.

8. A compensating piston having a head, an expansible skirt comprising a helical band bearing at one end upon said head and extending substantially the entire length of the piston, and means including springs setting up forces acting longitudinally of the piston upon the other end of said band to effect expansion of the skirt.

9. A compensating piston comprising a head, an annular plate below said head, an expanding skirt consisting of a helical band of thin, flat, sheet material and interposed between said plate and said head, and longitudinal pressure-producing means including springs drawing said plate toward said head thereby automatically to always hold said convolutions together and to effect expansion of the skirt.

CLIFTON J. CURTIS.